US012598107B2

(12) United States Patent
Venkataraman et al.

(10) Patent No.:   US 12,598,107 B2
(45) Date of Patent:       Apr. 7, 2026

(54) NETWORK SLICE QUOTA MANAGEMENT ENHANCEMENTS

(71) Applicant: Apple Inc., Cupertino, CA (US)

(72) Inventors: Vijay Venkataraman, San Jose, CA (US); Alosious Pradeep Prabhakar, Singapore (SG); Krisztian Kiss, Rancho Santa Fe, CA (US); Rohit R. Matolia, Bangalore (IN)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 18/546,661

(22) PCT Filed: Feb. 10, 2022

(86) PCT No.: PCT/US2022/070607
§ 371 (c)(1),
(2) Date: Aug. 16, 2023

(87) PCT Pub. No.: WO2022/178495
PCT Pub. Date: Aug. 25, 2022

(65) Prior Publication Data

US 2024/0137277 A1       Apr. 25, 2024
US 2024/0235941 A9       Jul. 11, 2024

(30) Foreign Application Priority Data

Feb. 17, 2021   (IN) .............................. 202141006621

(51) Int. Cl.
*H04L 12/00*         (2006.01)
*H04L 41/082*        (2022.01)
(Continued)

(52) U.S. Cl.
CPC ........ *H04L 41/0896* (2013.01); *H04L 41/082* (2013.01); *H04W 24/02* (2013.01); *H04W 36/0022* (2013.01)

(58) Field of Classification Search
CPC ............... H04L 41/0896; H04L 41/082; H04L 41/0895; H04L 41/5009; H04L 43/06;
(Continued)

(56) References Cited

U.S. PATENT DOCUMENTS

2018/0376384 A1   12/2018  Youn et al.
2019/0124561 A1*   4/2019  Faccin .................. H04W 48/18
(Continued)

FOREIGN PATENT DOCUMENTS

CN       111226472 A  *  6/2020   ........ H04W 36/0022
CN       114902738 A  *  8/2022   ............ H04W 48/06
(Continued)

*Primary Examiner* — Frantz Coby
(74) *Attorney, Agent, or Firm* — Fay Kaplun & Marcin, LLP

(57)       ABSTRACT

A network function is responsible for enforcing network slice quotas. The network function identifies a network slice quota for a single network slice selection assistance information (S-NSSAI), determines that the network slice quota for the S-NSSAI includes a first quota corresponding to fifth generation (5G) packet data unit (PDU) sessions and a second quota corresponding to interworking handovers between a fifth generation core (5GC and an evolved packet core (EPC), receives a request to update the network slice quota and updates the network slice quota for the S-NSSAI based on the request.

21 Claims, 15 Drawing Sheets

(51) Int. Cl.
     *H04L 41/0896*      (2022.01)
     *H04W 24/02*       (2009.01)
     *H04W 36/00*       (2009.01)

(58) Field of Classification Search
     CPC .... H04L 43/20; H04L 43/0876; H04W 24/02;
               H04W 36/0022; H04W 8/18; H04W
                                            76/22
     USPC .......................................................... 370/229
     See application file for complete search history.

(56)                  References Cited

U.S. PATENT DOCUMENTS

2021/0297977 A1 *  9/2021  Prabhakar ............... H04W 8/06
2023/0099435 A1 *  3/2023  Roy .................... H04L 65/1073
                                                      370/230

FOREIGN PATENT DOCUMENTS

| CN | 112352400 B | * | 10/2023 | .......... H04M 15/785 |
| EP | 3634041 A1 | * | 4/2020 | ............ H04W 48/16 |
| WO | WO-2018128529 A1 | * | 7/2018 | ............. H04W 8/02 |
| WO | 2019/219182 | | 11/2019 | |
| WO | WO-2019219182 A1 | * | 11/2019 | ............ H04M 15/80 |
| WO | 2020/069938 | | 4/2020 | |
| WO | 2020/088802 | | 5/2020 | |
| WO | WO-2020088802 A1 | * | 5/2020 | ............ H04W 76/10 |
| WO | WO-2021136599 A1 | * | 7/2021 | ............ H04W 48/06 |

* cited by examiner

Method 300

305 — NSQ determines that a S-NSSAI is subject to the 5G only quota management scheme 310 — PDU session is established in the 5GC 315 — NSQ decrements the 5GC quota by 1 based on the PDU session establishment 320 — PDU session is transferred from the 5GC to the EPC 325 — NSQ increments the 5GC quota by 1 after the transfer Start End Method 400

Start

405  NSQ determines that a S-NSSAI is subject to the 5G only quota management scheme 410  PDN session is established in the EPC 415  PDN session is transferred from the EPC to the 5GC 420  NSQ decrements the IWK quota by 1 after the transfer 425  The PDU session is transferred from the 5GC back to the EPC 430  NSQ increments the IWK quota by 1 after the transfer End

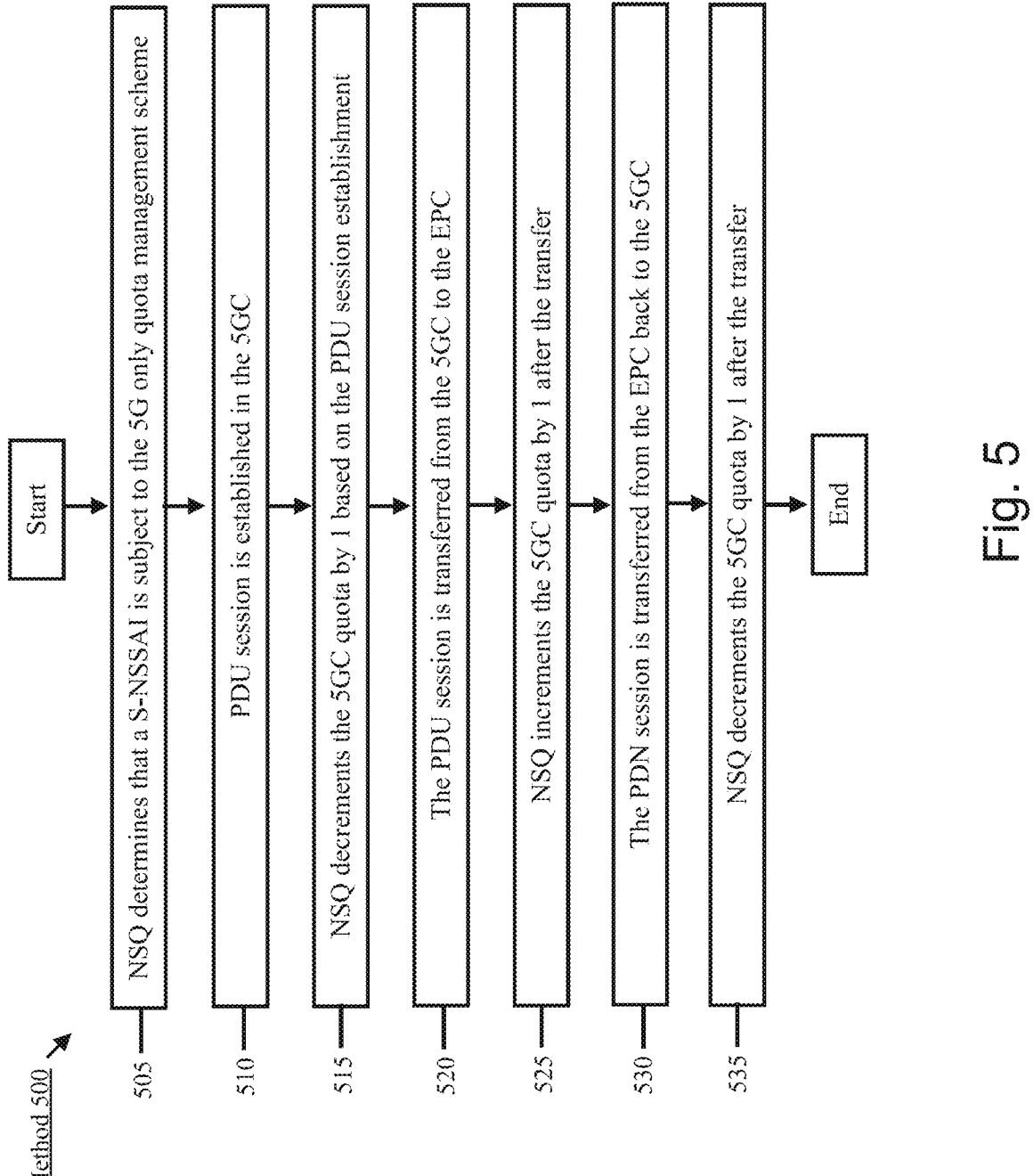

Method 500

505 NSQ determines that a S-NSSAI is subject to the 5G only quota management scheme 510 PDU session is established in the 5GC 515 NSQ decrements the 5GC quota by 1 based on the PDU session establishment 520 The PDU session is transferred from the 5GC to the EPC 525 NSQ increments the 5GC quota by 1 after the transfer 530 The PDN session is transferred from the EPC back to the 5GC 535 NSQ decrements the 5GC quota by 1 after the transfer Start End

Fig. 5

Method 600

605  NSQ determines that a S-NSSAI is subject to the 5G only quota management scheme 610  PDN session is established in the EPC 615  PDN session is transferred from the EPC to the 5GC 620  The NSQ decrements the IWK quota by 1 after the transfer Start End Method 700

705  NSQ determines that a S-NSSAI is subject to the unified quota management scheme 710  PDU session is established in the 5GC 715  NSQ decrements the 5GC quota by 1 based on the PDU session establishment 720  The PDU session is transferred from the 5GC to the EPC 725  NSQ increments the 5GC quota by 1 after the transfer 730  NSQ decrements the IWK quota by 1 after the transfer Start End Method 800

Start

805  NSQ determines that a S-NSSAI is subject to the unified quota management scheme 810  PDN session is established in the EPC 815  NSQ determines that the APN associated with the PDN on the EPC has a corresponding 5G S-NSSAI associated with the same DNN 820  NSQ decrements the IWK quota by 1 based on the PDN session establishment 825  PDN session is transferred from the EPC to the 5GC 830  NSQ does not decrement or increment either the 5GC quota or the IWK quota after the transfer 835  PDN session is transferred from the EPC to the 5GC 840  NSQ does not decrement or increment either the 5GC quota or the IWK quota after the transfer End

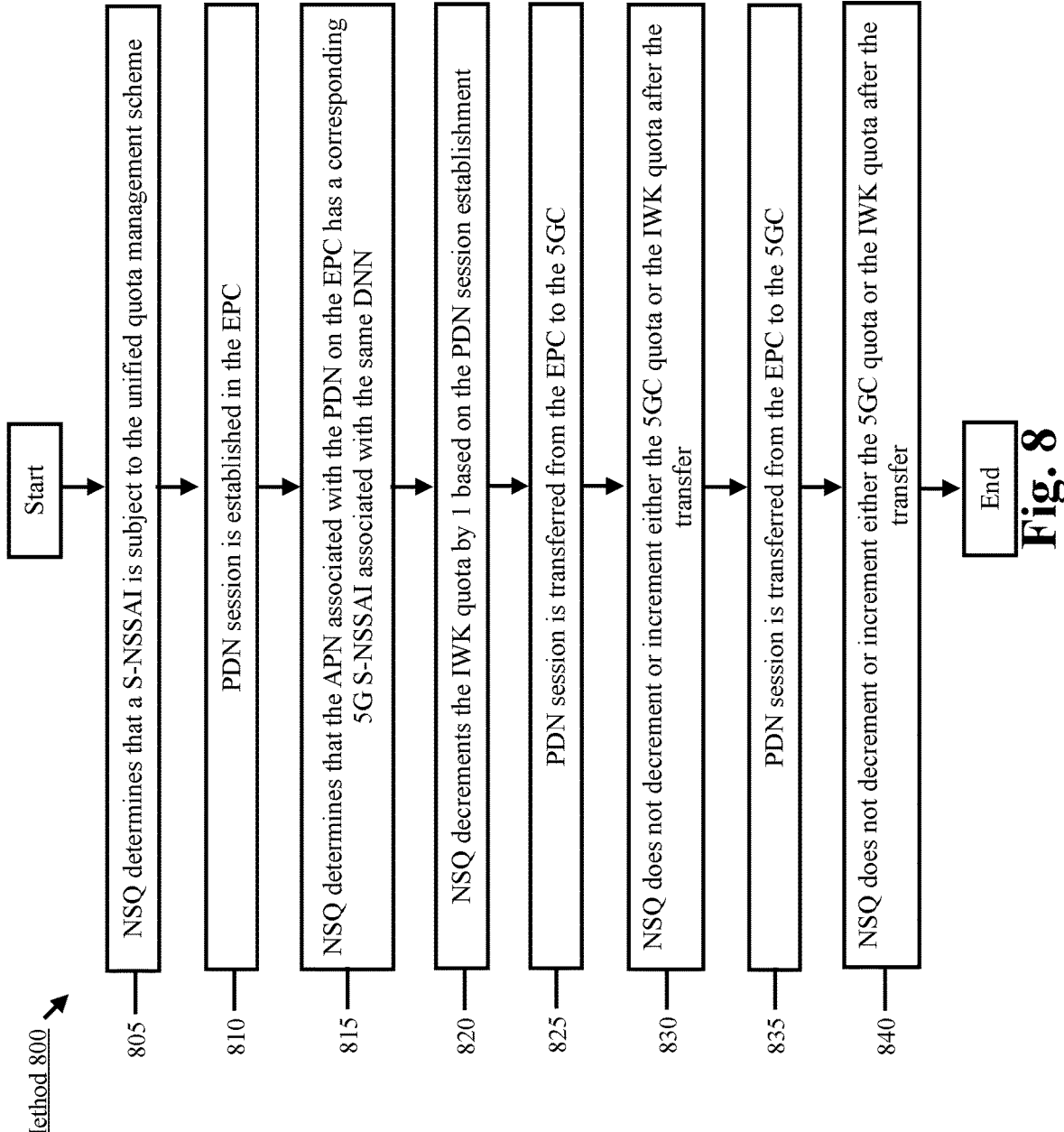

Fig. 8

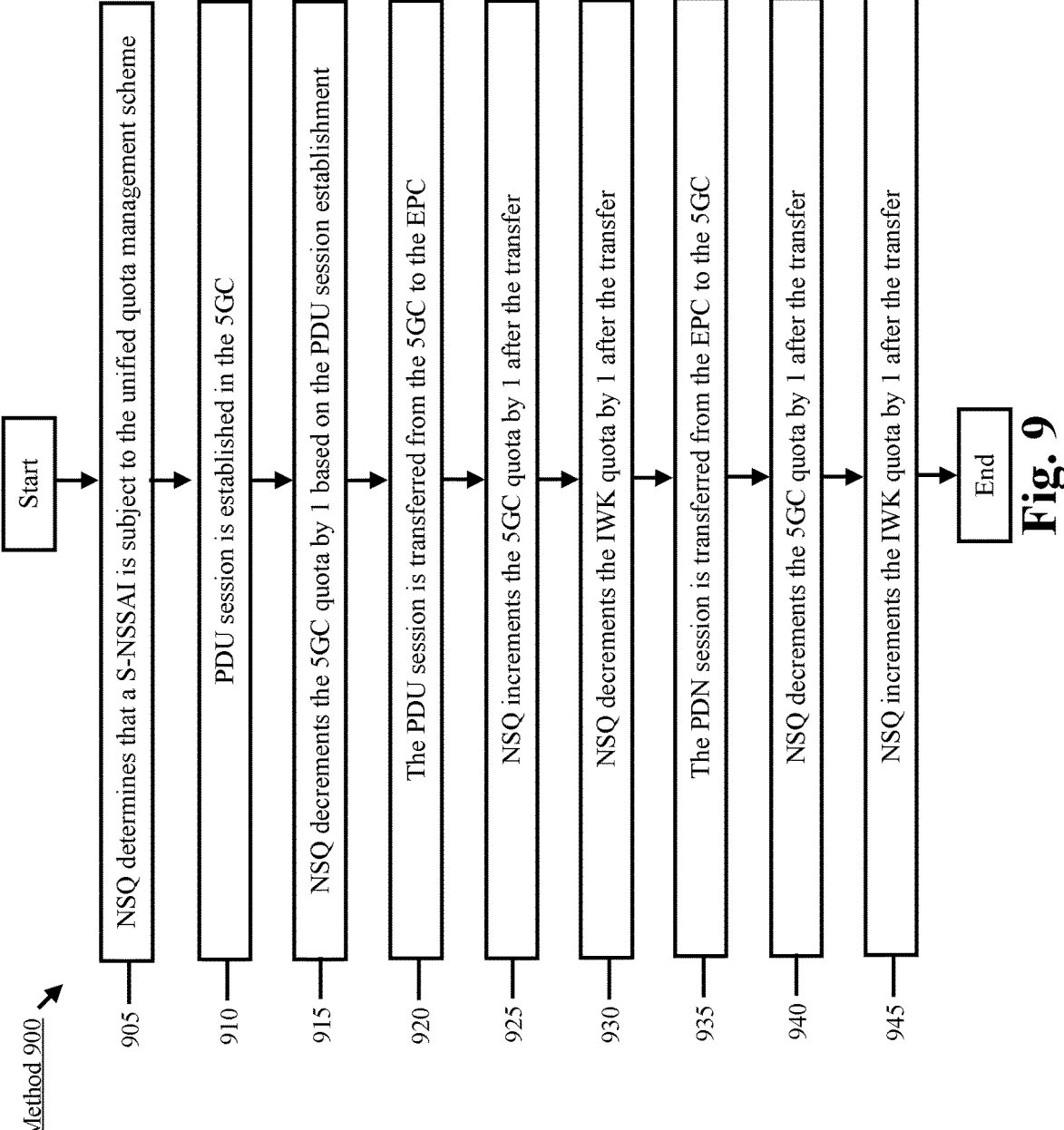

Method 900

905 NSQ determines that a S-NSSAI is subject to the unified quota management scheme 910 PDU session is established in the 5GC 915 NSQ decrements the 5GC quota by 1 based on the PDU session establishment 920 The PDU session is transferred from the 5GC to the EPC 925 NSQ increments the 5GC quota by 1 after the transfer 930 NSQ decrements the IWK quota by 1 after the transfer 935 The PDN session is transferred from the EPC to the 5GC 940 NSQ decrements the 5GC quota by 1 after the transfer 945 NSQ increments the IWK quota by 1 after the transfer Start End

Fig. 9

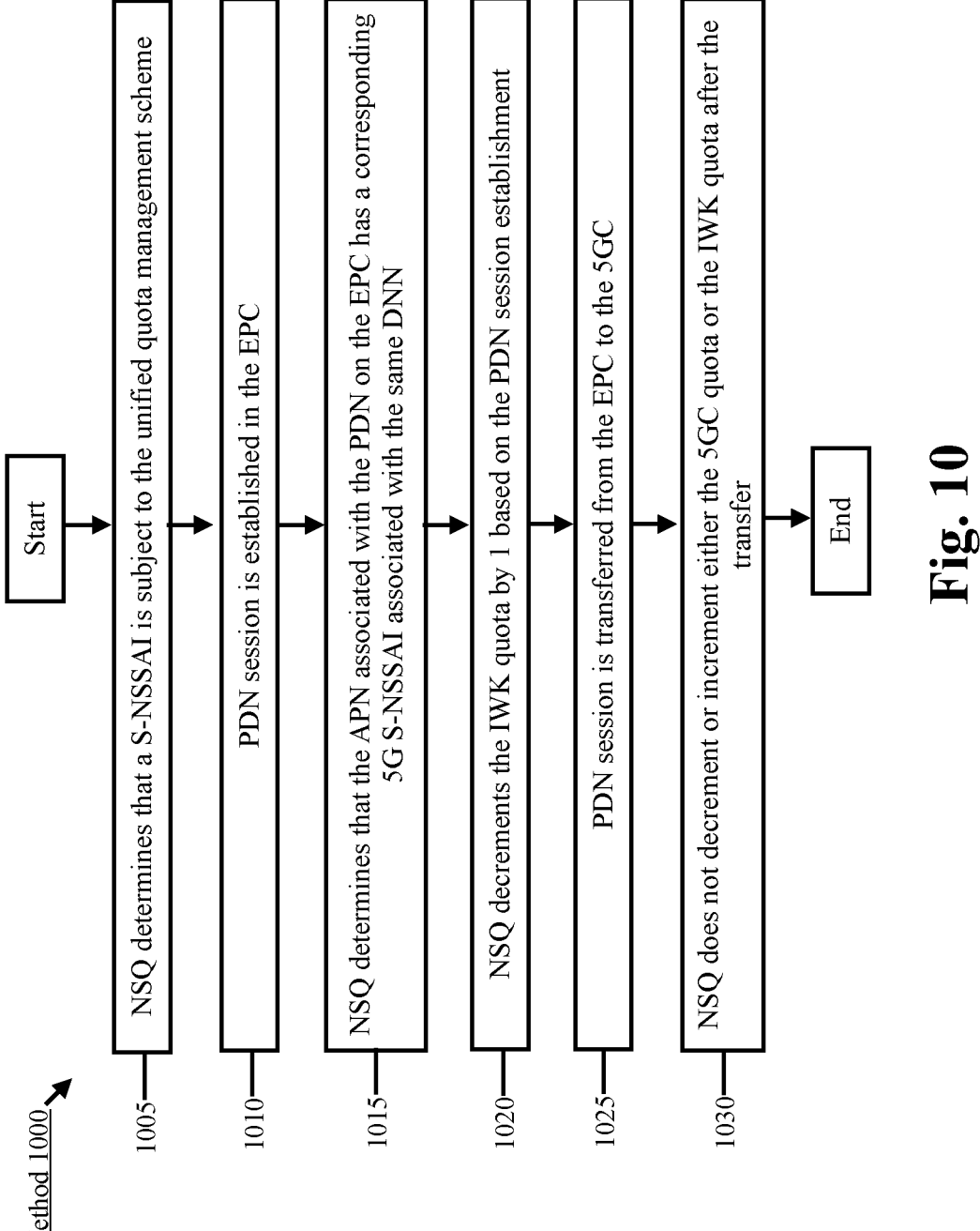

Method 1000

1005  NSQ determines that a S-NSSAI is subject to the unified quota management scheme 1010  PDN session is established in the EPC 1015  NSQ determines that the APN associated with the PDN on the EPC has a corresponding 5G S-NSSAI associated with the same DNN 1020  NSQ decrements the IWK quota by 1 based on the PDN session establishment 1025  PDN session is transferred from the EPC to the 5GC 1030  NSQ does not decrement or increment either the 5GC quota or the IWK quota after the transfer

Fig. 10

NSQ Decision Making Table 1100

| Scenarios | PDU Session transfer 5GC to EPC | | PDN transfer EPC to 5GC | |
| --- | --- | --- | --- | --- |
| | PDU session Originated in 5GC | Originated in EPC | PDU session Originated in 5GC | Originated in EPC |
| 5G Quota Management | (1105 — Method 300) Quota currently used: 5GS. Quota after handover: None. Procedure: Increment the 5GS quota by 1 | (1110 — Method 400) Quota currently used: IWK. Quota after handover: None. Procedure: Increment the IWK quota by 1 | (1115 — Method 500) Quota currently used: None. Quota after handover: 5GC. Procedure: Decrement the 5GC quota by 1, if 5GC quota is not available, then decrement the IWK quota | (1120 — Method 600) Quota currently used: None. Quota after handover: IWK. Procedure: Decrement the IWK quota by 1, if IWK quota is not available, then decrement the 5GC quota |
| Unified Quota Management | (1125 — Method 700) Quota currently used: 5GC. Quota after handover: IWK. Procedure: Increment the 5GC quota by 1; Decrement the IWK for the same S-NSSAI as utilized in 5GS quota by 1. If IWK quota is not available, then decrement the 5GC quota | (1130 — Method 800) Check if the APN associated with the PDN on EPC has a corresponding 5G S-NSSAI associated with same DNN on 5G. If yes, Quota currently used: IWK. Quota after handover: IWK. Procedure: Maintain the same quota in IWK | (1135 — Method 900) Quota currently used: IWK. Quota after handover: 5GC. Procedure: Increment the IWK quota by 1; Decrement the 5GC quota by 1. If 5GC quota is not available, then decrement the IWK quota | (1140 — Method 1000) Check if the APN associated with the PDN on EPC has a corresponding 5G S-NSSAI associated with same DNN on 5G. If yes, Quota currently used: IWK. Quota after handover: IWK. Procedure: Maintain the same quota in IWK |

Fig. 11

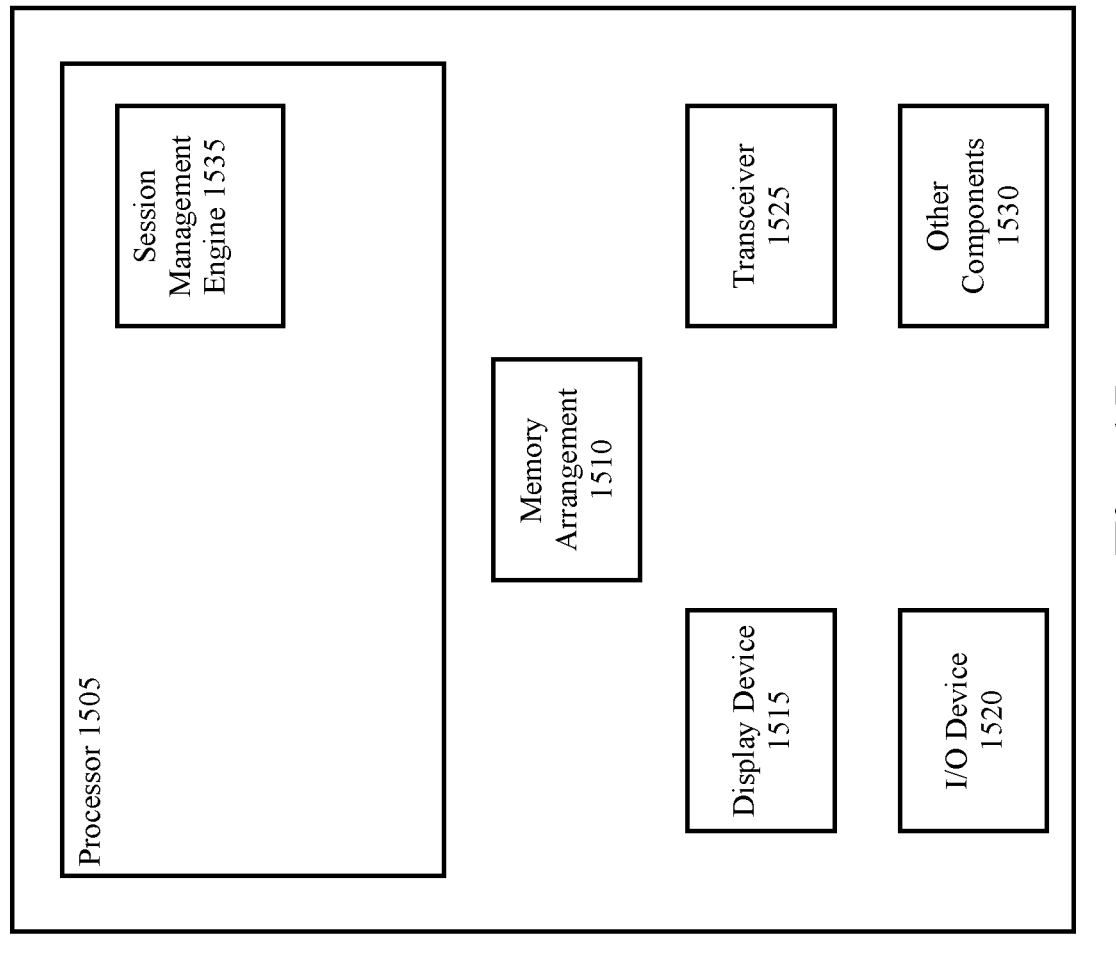
UE 110
Fig. 15

NETWORK SLICE QUOTA MANAGEMENT ENHANCEMENTS

BACKGROUND

A network may deploy multiple network slices. Generally, a network slice refers to an end-to-end logical network that is configured to provide a particular service and/or possess particular network characteristics. Each network slice may be isolated from one another but run on a shared network infrastructure. Thus, each network slice may share network resources but facilitate different functionality.

A network operator may want to limit the number of devices registered to a particular network slice. The network may be equipped with a network slice quota (NSQ) function to perform this task. For example, the NSQ function may perform various operations related to managing the number of UEs registered to an individual network slice.

A UE may establish a session with a remote endpoint via the network connection. During the lifespan of the session, the network may perform a handover of the session from fifth generation (5G) to long-term evolution (LTE) or vice versa. For example, there may be scenarios in which the network is triggered to handover an evolved packet core (EPC) packet data network (PDN) session to the fifth generation core (5GC). Similarly, there may be scenarios in which the network is triggered to handover a 5GC packet data unit (PDU) session to the EPC. It has been identified that there is a need for quota management techniques that are configured to account for these types of handover scenarios.

SUMMARY

Some exemplary embodiments are related to a processor of a network function configured to perform operations. The operations include identifying a network slice quota for a single network slice selection assistance information (S-NSSAI), determining that the network slice quota for the S-NSSAI includes a first quota corresponding to fifth generation (5G) packet data unit (PDU) sessions and a second quota corresponding to interworking handovers between a fifth generation core (5GC and an evolved packet core (EPC), receiving a request to update the network slice quota and updating the network slice quota for the S-NSSAI based on the request.

Other exemplary embodiments are related to a computer readable storage medium storing instructions that are executable by a processor, wherein the instructions cause the processor to perform operations. The operations include identifying a network slice quota for a single network slice selection assistance information (S-NSSAI), determining that the network slice quota for the S-NSSAI includes a first quota corresponding to fifth generation (5G) packet data unit (PDU) sessions and a second quota corresponding to interworking handovers between a fifth generation core (5GC and an evolved packet core (EPC), receiving a request to update the network slice quota and updating the network slice quota for the S-NSSAI based on the request.

BRIEF DESCRIPTION OF THE DRAWINGS

FIG. 5 shows a method for the 5GC only quota management scheme according to various exemplary embodiments.

FIG. 8 shows a method for the unified quota management scheme according to various exemplary embodiments.

FIG. 9 shows a method 900 for the unified quota management scheme according to various exemplary embodiments.

FIG. 10 shows a method for the unified quota management scheme according to various exemplary embodiments.

FIG. 11 shows a NSQ decision making table according to various exemplary embodiments.

FIG. 15 shows an exemplary user equipment (UE) according to various exemplary embodiments.

DETAILED DESCRIPTION

Figure 1:
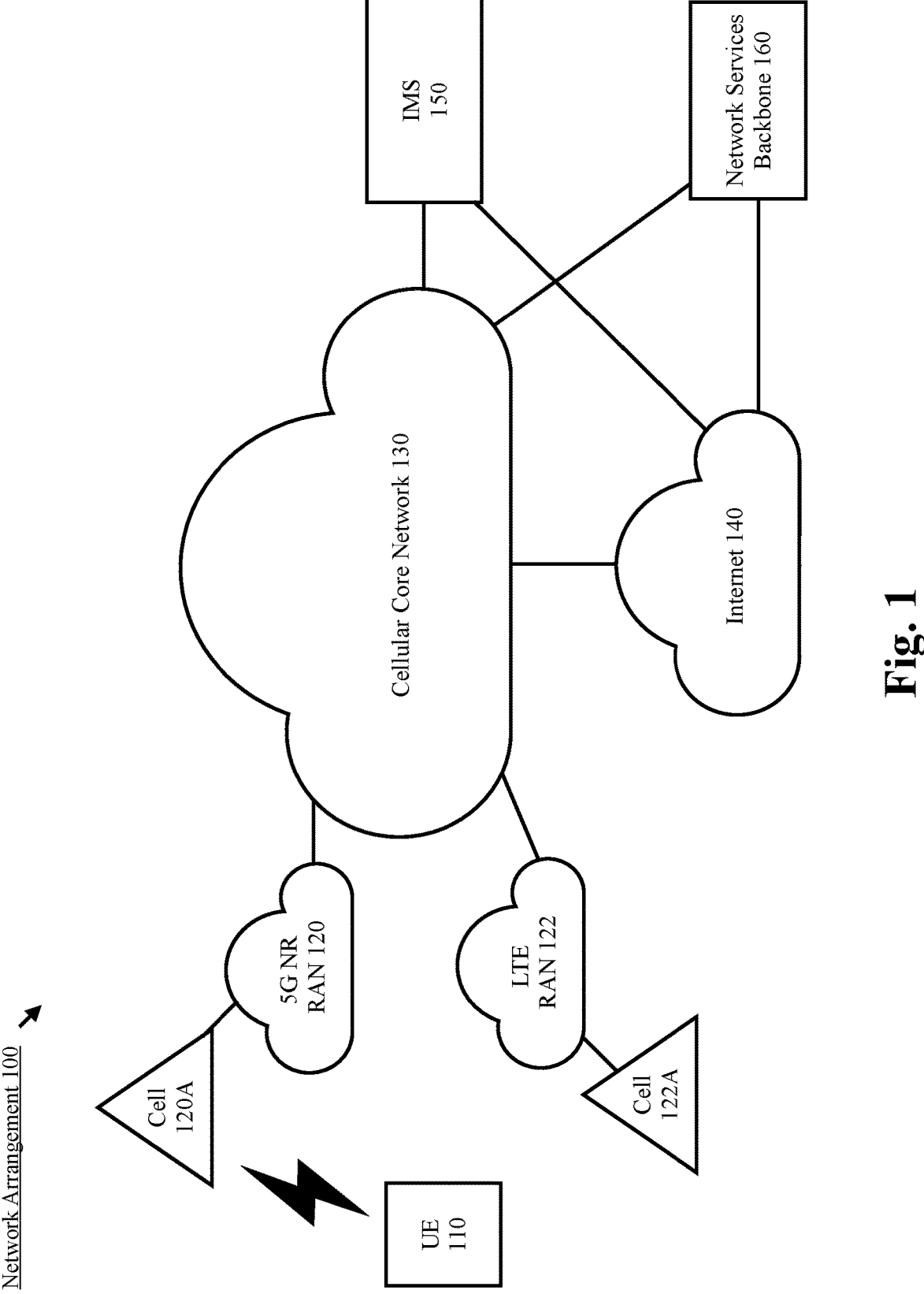
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to network slice quota management.

The exemplary embodiments are described with regard to a fifth generation (5G) network that supports network slicing. Generally, network slicing refers to a network architecture in which multiple end-to-end logical networks run on a shared physical network infrastructure. Each network slice may be configured to provide a particular set of capabilities and/or characteristics. Thus, the physical infrastructure of the 5G network may be sliced into multiple virtual networks, each configured for a different purpose. Throughout this description, reference to a network slice may represent any type of end-to-end logical network that is configured to serve a particular purpose and implemented on the 5G physical infrastructure.

A user equipment (UE) may be configured to utilize one or more network slices. To provide one example, the UE may utilize a first network slice for one or more carrier services (e.g., voice, multimedia messaging service (MMS), Internet, etc.) and a second different network slice for a third-party service. However, the configured purpose of a network slice is beyond the scope of the exemplary embodiments. The exemplary embodiments are not limited to any particular type of network slice. Instead, the exemplary embodiments relate to improving the manner in which the network performs slice quota management.

A network slice may be identified by single network slice selection assistance information (S-NSSAI). Each S-NSSAI may be associated with a public land mobile network (PLMN) and may include the slice service type (SST) and a slice descriptor (SD). The SST may identify the expected behavior of the corresponding network slice with regard to services, features and characteristics. The SD may identify any one or more entities associated with the network slice. For example, the SD may indicate an owner or an entity that manages the network slice (e.g., carrier) and/or the entity that the is providing the application/service via the network slice (e.g., a third-party, the entity that provides the application or service, etc.). In some embodiments, the same entity may own the slice and provide the service (e.g., carrier services). Throughout this description, S-NSSAI refers to a single network slice and NSSAI may generally refer to one or more network slices.

The exemplary embodiments are also described with regard to a network slice quota function (NSQ). The NSQ refers to a network function configured to control and restrict the number of UEs registered to a particular network slice. For example, the NSQ may perform various operations related to enforcing a quota for a maximum number of UEs registered to a particular network slice (e.g., S-NSSAI). However, reference to the term NSQ is merely provided for illustrative purposes. Different networks may refer to a similar entity by a different name, for example, 3GPP networks may use the terms NSQ and network slice admission control function (NSACF) interchangeably.

The UE may establish a session with a remote endpoint via the network connection. During the lifespan of the session, the network may perform a handover of the session from 5G to long-term evolution (LTE) or vice versa. For example, there may be scenarios in which the network is triggered to handover an evolved packet core (EPC) packet data network (PDN) session to the fifth generation core (5GC). To provide another example, there may be scenarios in which the network is triggered to handover a 5GC packet data unit (PDU) session to the EPC. Throughout this description these types of handover scenarios may be generally referred to as "interworking handover scenarios." It has been identified that there is a need for network slice quota management techniques that are configured to account for interworking handover scenarios.

The exemplary embodiments include enhancements for network slice quota management that are configured to address interworking handover scenarios. These enhancements and the other exemplary quota management techniques described herein may each be implemented in conjunction with other currently implemented quota management techniques, future implementations of quota management techniques or independently from other quota management techniques.

As will be described in more detail below, the exemplary embodiments utilize a network slice quota that is partitioned into two or more parts. A first portion of the network slice quota represents a quota for 5GC PDU sessions and a second portion of the network slice quota represents a quota for PDU sessions which may experience a handover from EPC to 5GC. In addition, the exemplary embodiments include two different exemplary quota management schemes that may employ the multi-part network slice quota referenced above. One exemplary quota management scheme is specific to 5G systems and the other exemplary quota management scheme that is unified across 5G and LTE. Specific examples of both these exemplary quota management schemes will be provided in detail below.

FIG. 1 shows an exemplary network arrangement 100 according to various exemplary embodiments. The exemplary network arrangement 100 includes a UE 110. Those skilled in the art will understand that the UE 110 may represent any type of electronic component that is configured to communicate via a network, e.g., mobile phones, tablet computers, desktop computers, smartphones, phablets, embedded devices, wearables, Internet of Things (IoT) devices, etc. In the network arrangement 100 only a single UE 110 is shown. However, an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120 and an LTE RAN 122. However, the UE 110 may also communicate with other types of networks (e.g. 5G cloud RAN, a next generation RAN (NG-RAN), a legacy cellular network, a WLAN, etc.) and the UE 110 may also communicate with networks over a wired connection. With regard to the exemplary embodiments, the UE 110 may establish a connection with the 5G NR RAN 120 and/or the LTE RAN 122. Therefore, the UE 110 may have a 5G NR chipset to communicate with the NR RAN 120 and an LTE chipset to communicate with the LTE RAN 122.

The 5G NR RAN 120 and the LTE RAN 122 may be a portion of a cellular network that may be deployed by a network carrier (e.g., Verizon, AT&T, T-Mobile, etc.). The RANs 120, 122 may include cells that are configured to send and receive traffic from UEs that are equipped with the appropriate cellular chip set. In this example, the 5G NR RAN 120 includes the cell 120A and the LTE RAN 122 includes the cell 122A. However, reference to a cell is merely provided for illustrative purposes, any appropriate cell or base station may be deployed (e.g., Node Bs, eNodeBs, HeNBs, eNBs, gNBs, gNodeBs, macrocells, microcells, small cells, femtocells, etc.).

Those skilled in the art will understand that any association procedure may be performed for the UE 110 to connect to the 5G NR RAN 120 or the LTE RAN 122. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., cell 120A). Those skilled in the art will understand that In addition to the RANs 120-122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. As mentioned above, the exemplary embodiments relate to a NSQ and interworking between 5G systems and EPC. A specific example of a network architecture for interworking between 5GC and EPC is provided below with regard to FIG. 2. While the cellular core network 130 is shown as a single entity in FIG. 2, those skilled in the art will understand that the EPC and the 5GC may be implemented as separate network arrangements, may be collocated as shown in FIG. 2, or may have some components separately located and some components collocated.

Returning to the network arrangement 100, the cellular core network 130 may also manage the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
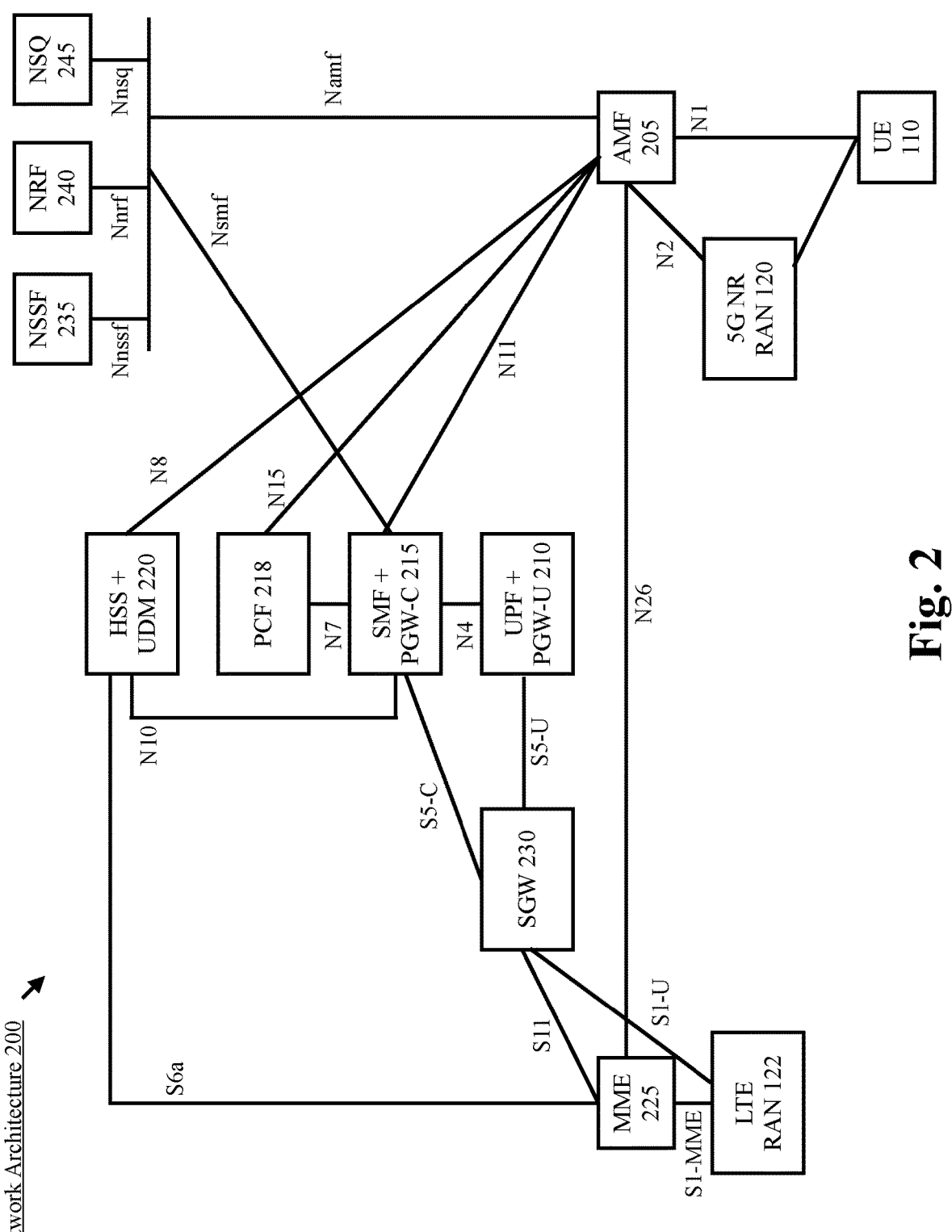
FIG. 2 shows a networking architecture for interworking between a fifth generation core (5GC) and an evolved packet core (EPC) according to various exemplary embodiments.

FIG. 2 shows a networking architecture 200 for interworking between 5GC and EPC according to various exemplary embodiments. The following description will provide a general overview of the various components of the exemplary architecture 200. The specific operations performed by the components with respect to the exemplary embodiments will be described in greater detail after the description of the architecture 200.

Those skilled in the art will understand that the components of the exemplary architecture 200 may reside in various physical and/or virtual locations relative to the network arrangement 100 of FIG. 1. These locations may include, within the access networks (e.g., RANs 120, 122), within the core network 130, as separate components outside of the locations described with respect to FIG. 1, etc.

In FIG. 2, the various components are shown as being connected via connections labeled Nx (e.g., N1, N2, N3, N4, N7, N8, N10, N11, N15, N26, etc.) or Sx (e.g., S1, S11, S6a, S5-C, S5-U, etc.). Those skilled in the art will understand that each of these connections (or interfaces) are defined in the 3GPP Specifications. The exemplary architecture 200 is using these connections in the manner in which they are defined in the 3GPP Specifications. Furthermore, while these interfaces are termed connections throughout this description, it should be understood that these interfaces are not required to be direct wired or wireless connections, e.g., the interfaces may communicate via intervening hardware and/or software components. To provide an example, the UE 110 may exchange signals over the air with the cell 120A. However, in the architecture 200 the UE 110 is shown as having a connection to the Access and Mobility Management Function (AMF) 205. This connection or interface is not a direct communication link between the UE 110 and the AMF 205, but is a connection that is facilitated by intervening hardware and software components. Thus, throughout this description the terms "connection" and "interface" may be used interchangeably to describe the Nx or Sx interface between the various components.

The architecture 200 includes the UE 110, the 5G NR RAN 120 and the LTE RAN 122. In this example, the UE 110 is shown as being camped on the 5G NR RAN 120. However, those skilled in the art will understand that the exemplary embodiments may apply to scenarios in which the UE 110 is camped on the 5G NR RAN 120 and/or the LTE RAN 122.

The UE 110 and the 5G NR RAN 120 are connected to the AMF 205. The AMF 205 is generally responsible for mobility management in the 5G NR RAN 120. For example, the AMF 205 may be responsible for managing handovers between gNBs.

The NR-RAN 120 is connected to the user plane function (UPF)+packet data network gateway (PGW)-user plane (U) 210. The UPF+PGW-U 210 may be dedicated for interworking between the 5GC and EPC. UEs that are not subject to 5GC and EPC interworking may be served by entities not dedicated for interworking, e.g., PGW, UPF, etc.

The AMF 205 is connected to the session management function (SMF)+PGW-control plane (C) 215. The SMF+PGW-C 215 may be dedicated for interworking between the 5GC and EPC. UEs that are not subject to 5GC and EPC interworking may be served by entities not dedicated for interworking, e.g., PGW, SMF, etc.

The network architecture 200 also includes a policy charging function (PCF) 218 and a home subscriber server (HSS)+unified data management (UDM) 220. The PCF 218 may govern control plan functions via policy rules and user plane functions via policy enforcement. The HSS+UDM 220 may handle subscription related information to support various network services.

On the EPC side, the network architecture 200 also includes a mobility management entity (MME) 225 and a serving gateway (SGW) 230. The MME 225 is generally responsible for mobility management in the LTE RAN 122. The SGW 230 is in the user plane and may perform operations related to packet forwarding and routing.

The AMF 205 and the SMF+PGW-C 215 are also connected to the network slice selection function (NSSF) 235, the network repository function (NRF) 240 and the NSQ 245. The NSSF 235 performs operations related to network slices. For example, the NSSF 235 may select a set of network slice instances serving the UE 110. The NSSF 235 may also manage one or more databases that include a mapping table of S-NSSAI and the frequency bands in which the S-NSSAI is allowed to operate. The NRF 240 may perform operations related to network service discovery functionality which allows network functions to determine where and how to access other network functions.

The NSQ 245 may be configured to perform operations related to controlling the number of UEs registered per network slice. For example, the NSQ 245 may perform operations such as, but not limited to, maintaining a count of a number of registered UEs for a S-NSSAI and maintaining a count of a number of active PDU sessions for a S-NSSAI.

To provide a more specific example, when deployed, the NSQ 245 may receive a register request from the SMF 215 indicating that the UE 110 wants to register a PDU session within a particular S-NSSAI. The NSQ 245 then checks the count of registered UEs within the S-NSSAI and determines whether the network slice quota has been reached. The NSQ 245 may then accept or reject the register request based on the count and the quota. However, reference to a quota concept is merely provided for illustrative purposes. Those skilled in the art will understand that different entities may refer to similar concepts by a different name. For example, 3GPP networks may use the terms quota and admission control to refer to the same concept.

The network architecture 200 is one example of how interworking between 5GC and EPC may be implemented. Those skilled in the art will understand that the exemplary concepts described herein may be applicable to any appropriate network architecture enabling interworking between the 5GC and EPC.

The exemplary embodiments relate to implementing enhancements for network slice quota management. Initially, a brief general overview of some of the exemplary enhancements is provided below. Subsequently, specific details regarding the operations that may be performed by the NSQ 245 to implement these exemplary enhancements are provided below with regard to FIGS. 3-10. In addition, exemplary call flows for network slice quota management are provided below with regard to FIGS. 12-14.

The network operator may want to limit the number of UEs registered to a particular network slice (e.g., S-NSSAI).

Accordingly, a network slice may be configured with a quota for a maximum number of registered UEs. One exemplary enhancement relates to the NSQ 245 partitioning the network slice quota into multiple parts. While the examples provided herein reference a network slice quota portioned into two parts, those skilled in the art will understand that the exemplary enhancements may be applicable to a network slice quota that includes two or more parts.

To provide an example, the NSQ 245 may receive a network slice quota from the operations, administration and maintenance (OAM) as per the operator defined policies and requirements. The NSQ 245 (or the OAM) may partition the network slice quota into two parts. Throughout this description, one part of the network slice quota may be referred to as the "5GC quota" which may represent a quota for a maximum number of registered 5G PDU sessions. The other part of the network slice quota may be referred to as the "interworking (IWK) quota" which may represent a quota for a maximum number of PDU sessions that may be handed over from the EPC to the 5GC. Together, the 5GC quota and the IWK quota are equal to the total network slice quota received from the OAM.

The network operator may want a majority of the network slice quota to be allocated to the 5GC quota. Thus, the IWK quota may be allocated a lesser portion of the network slice quota. However, any reference to a particular 5GC quota configuration or IWK quota configuration is merely provided for illustrative purposes. The exemplary network slice quota may include two or more parts configured in any appropriate manner.

The IWK quota allows the network to account for interworking handover scenarios. These interworking handover scenarios may be common events and without the IWK quota, the network slice may not be prepared for PDU sessions that are to be handed over from the EPC. Accordingly, under conventional circumstance, UEs may experience connectivity issues due to failed handover attempts when the network does not account for interworking handovers.

Another exemplary enhancement relates to the NSQ 245 tracking where a session originated. For example, PDU sessions originated in 5GC may be tagged by the NSQ 245 as 5GC originated sessions. Similarly, PDN sessions originated in the EPC may be tagged by the NSQ 245 as EPC originated sessions. In addition, based on a combination of PLLMN ID, SMF+PGW-C address and access point name (APN) used in the EPC, the NSQ 245 may be able to identify an association between the PDN session and the specific 5G specific S-NSSAI counterpart for quota management. The above parameters may enable mapping of the PDN session to the S-NSSAI in 5GC since it is possible that the same APN is used for more than 1 PDN session in EPC. As will be described in more detail below, these enhancements enable the NSQ 245 to manage the 5GC quotas and the IWK quotas of the network slices.

The exemplary embodiments include two different exemplary quota management schemes that may employ the multi-part network slice quota referenced above. One exemplary quota management scheme is specific to 5G systems and the other exemplary quota management scheme is unified across 5G and LTE. Specific examples of the 5GC only quota management scheme will be provided below with regard to FIGS. 3-6 and specific examples of the unified quota management scheme will be provided below with regard to FIGS. 7-10.

Another exemplary enhancement relates to providing the NSQ 245 with an indication of whether unified data management is supported for the S-NSSAI and the UE ID. This indication may be provided based on the service level agreements of the operator and include an indication as to which scheme is to be applied. If supported, 5G PDU sessions and EPC PDN sessions may both utilize the available network slice quota, e.g., the unified quota management scheme may be utilized. If not supported, only 5G PDU sessions may utilize the network slice quota, e.g., the 5GC only quota management scheme may be utilized.

Figure 3:
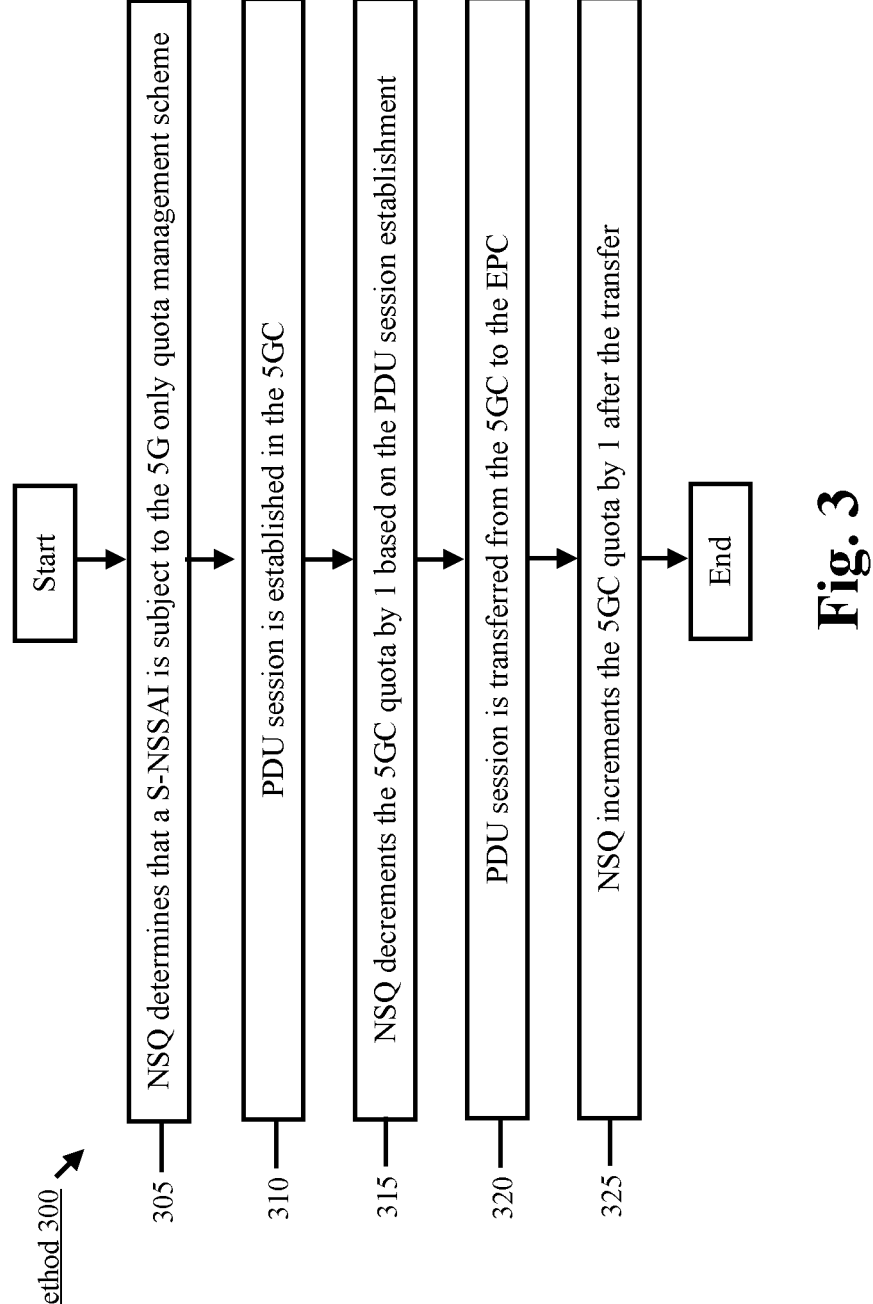
FIG. 3 shows a method for the 5GC only quota management scheme according to various exemplary embodiments.

FIG. 3 shows a method 300 for the 5GC only quota management scheme according to various exemplary embodiments. The method 300 is described from the perspective of the NSQ 245 of the network architecture 200.

In 305, the NSQ 245 determines that a S-NSSAI is subject to the 5GC only quota management scheme. In this scheme, the network slice quota for the S-NSSAI is partitioned into the 5GC quota and the IWK quota.

In 310, a PDU session is established for the UE 110 in the 5GC. In 315, the NSQ 245 may decrement 5GC quota by 1 based on the PDU session establishment.

Throughout this description, the terms "decrement" and "increment" with regard to a quota refers the count or availability corresponding to the network slice. For instance, the quotas may represent a fixed maximum value (Q). In addition, a counter may be used to keep count of the number registered UEs for a S-NSSAI and/or the number of active PDN/PDU sessions for a S-NSSAI. Thus, a count (C) may be altered based on registered UEs/sessions. A decrement to a quota means that there is less room available for additional UEs/sessions to be accounted for using the quota. This may be represented by C+1/Q and thus, a decrement to the quota may represent an addition to the count. An increment to the quota means that there is more room available for additional UEs/sessions to be accounted for using the quota. This may be represented by C−1/Q and thus, an increment to the quota may represent a subtraction to the count.

At this time, the UE 110 is currently accounted for using the 5GC quota. In 320, the PDU session may be transferred from the 5GC to the EPC (e.g., an interworking handover scenario). In 325, the NSQ 245 may increment 5GC quota by 1 after the handover. Since this is the 5G only quota management scheme, there is no quota that is configured to account for UEs/sessions that are not registered to the 5GC. In this example, the NSQ 245 may also maintain the IWK quota portion of the network slice quota. However, the IWK quota is irrelevant to the scenario described in the method 300.

Figure 4:
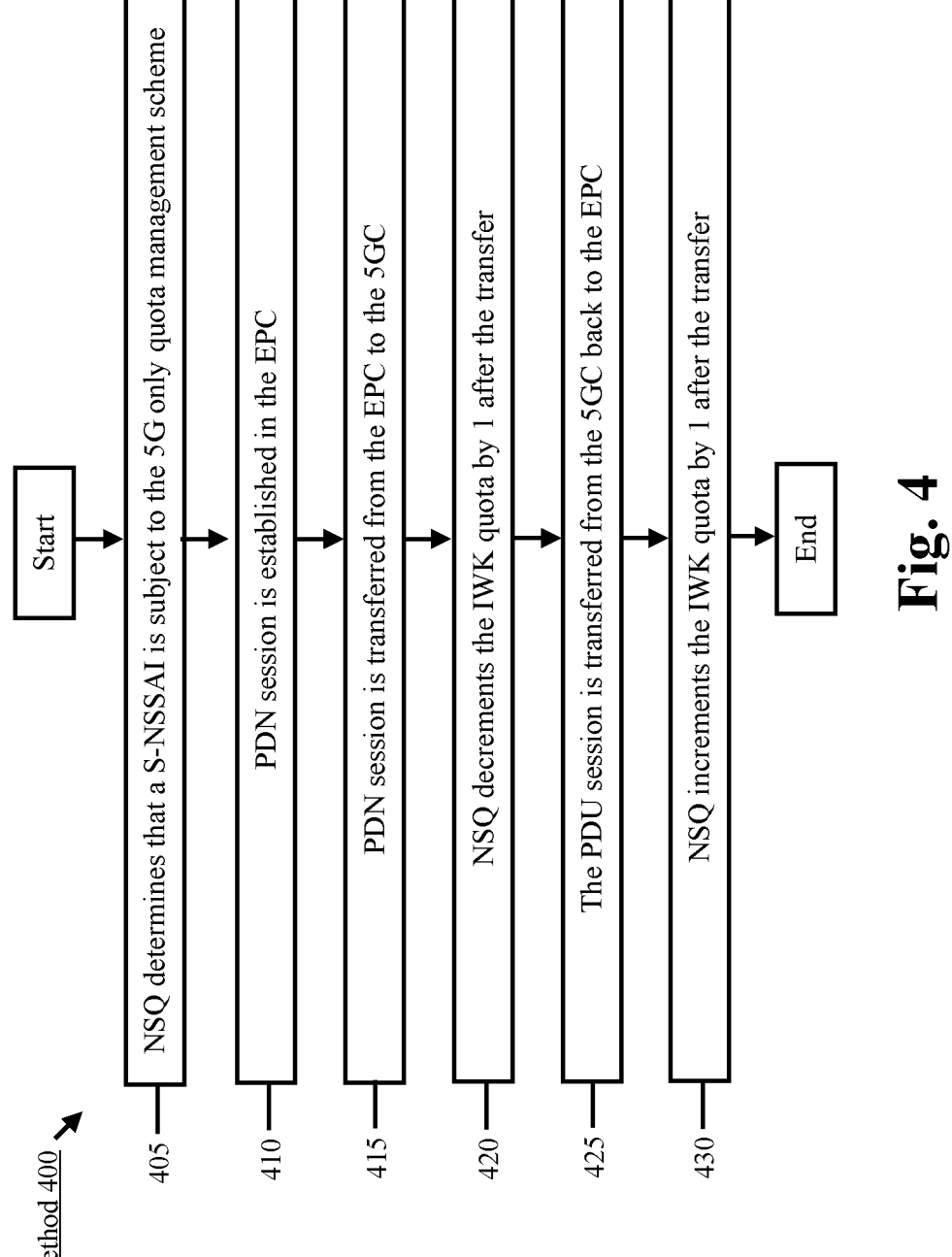
FIG. 4 shows a method for the 5GC only quota management scheme according to various exemplary embodiments.

FIG. 4 shows a method 400 for the 5GC only quota management scheme according to various exemplary embodiments. The method 400 is described from the perspective of the NSQ 245 of the network architecture 200.

In 405, the NSQ 245 determines that a S-NSSAI is subject to the 5GC only quota management scheme. In this scheme, the network slice quota for the S-NSSAI is partitioned into the 5GC quota and the IWK quota.

In 410, a PDN session is established for the UE 110 in the EPC. Since this is an example of the 5G only quota management scheme, there is no quota that is configured to account for UEs/sessions that are not registered to the 5GC.

In 415, the PDN session may be transferred from the EPC to the 5GC (e.g., an interworking handover scenario). The session may now be considered a 5G PDU session. In 420, the NSQ 245 may decrement the IWK quota by 1 after the handover. Since this is the 5G only quota management scheme, the IWK quota may be used to account for UEs/sessions that were handed over from the EPC to the 5GC.

In 425, the PDU session is transferred from the 5GC to the EPC. Thus, in this example, the session originates on the EPC, transfers to the 5GC and then transfers back to the EPC. In 430, the NSQ 245 may increment the IWK quota by 1 after the handover to the EPC. Since this is the 5G only quota management scheme, there is no quota that is configured to account for UEs/sessions that are not registered to the 5GC.

In some embodiments, if one of the 5GC quota or the IWK quota is not available, the NSQ 245 may utilize the availability of the other quota to account for either i) UEs/sessions registered to the 5GC or ii) sessions that may be handed over from the EPC to the 5GC. In other words, there may be scenarios in which a UE/session should be accounted for using the 5GC quota but the NSQ 245 has decided to account for this UE/session using the IWK quota or vice versa. In the example of the method 400, if the NSQ 245 determines that the IWK quota has been reached in 420, the NSQ 245 may still permit the transfer by accounting for the UE/session using the 5GC quota.

FIG. 5 shows a method 500 for the 5GC only quota management scheme according to various exemplary embodiments. The method 500 is described from the perspective of the NSQ 245 of the network architecture 200.

In 505, the NSQ 245 determines that a S-NSSAI is subject to the 5GC only quota management scheme. In this scheme, the network slice quota for the S-NSSAI is partitioned into the 5GC quota and the IWK quota.

In 510, a PDU session is established for the UE 110 in the 5GC. In 515, the NSQ 245 may decrement the 5GC quota by 1 based on the PDU session establishment. In 520, the PDU session may be transferred from the 5GC to the EPC (e.g., an interworking handover scenario). In 525, the NSQ 245 may increment the 5GC quota by 1 based on the handover.

At this time, the session that originated in the 5GC in 510 is now registered to the EPC as a PDN session. Since this is an example of the 5G only quota management scheme, there is no quota that is configured to account for UEs/sessions that are not registered to the 5GC.

In 530, the PDN sessions may be transferred from the EPC to back to the 5GC. In 535, the NSQ 245 may decrement the 5GC quota by 1 after the handover. As indicated above, in some embodiments, if the 5GC quota is full, the NSQ 245 may still permit the handover by accounting for the UE/session using the IWK quota. In this type of scenario, instead of decrementing the 5GC quota by 1, the NSQ 245 may decrement the IWK by 1.

Figure 6:
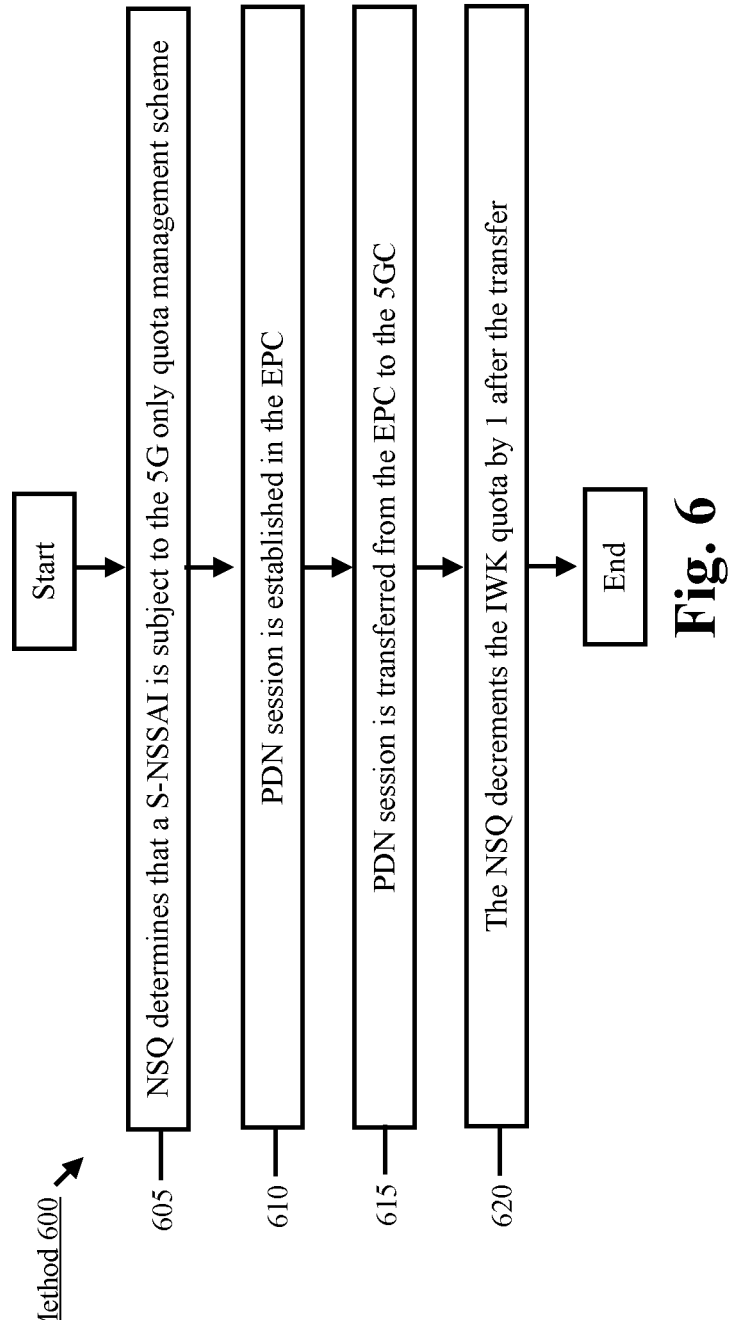
FIG. 6 shows a method for the 5GC only quota management scheme according to various exemplary embodiments.

FIG. 6 shows a method 600 for the 5GC only quota management scheme according to various exemplary embodiments. The method 600 is described from the perspective of the NSQ 245 of the network architecture 200.

In 605, the NSQ 245 determines that a S-NSSAI is subject to the 5GC only quota management scheme. In this scheme, the network slice quota for the S-NSSAI is partitioned into the 5GC quota and the IWK quota.

In 610, a PDN session is established for the UE 110 in the EPC. Since this is an example of the 5G only quota management scheme, there is no quota that is configured to account for UEs/sessions that are not registered to the 5GC.

In 615, the PDN session may be transferred to the 5GC. In 620, the NSQ 245 may decrement the IWK quota by 1 in response to the handover. As indicated above, in some embodiments, if the IWK quota is full, the NSQ 245 may still permit the handover by accounting for the UE/session using the 5GC quota. In this type of scenario, instead of decrementing the IWK quota by 1, the NSQ 245 may decrement the 5GC by 1.

Figure 7:
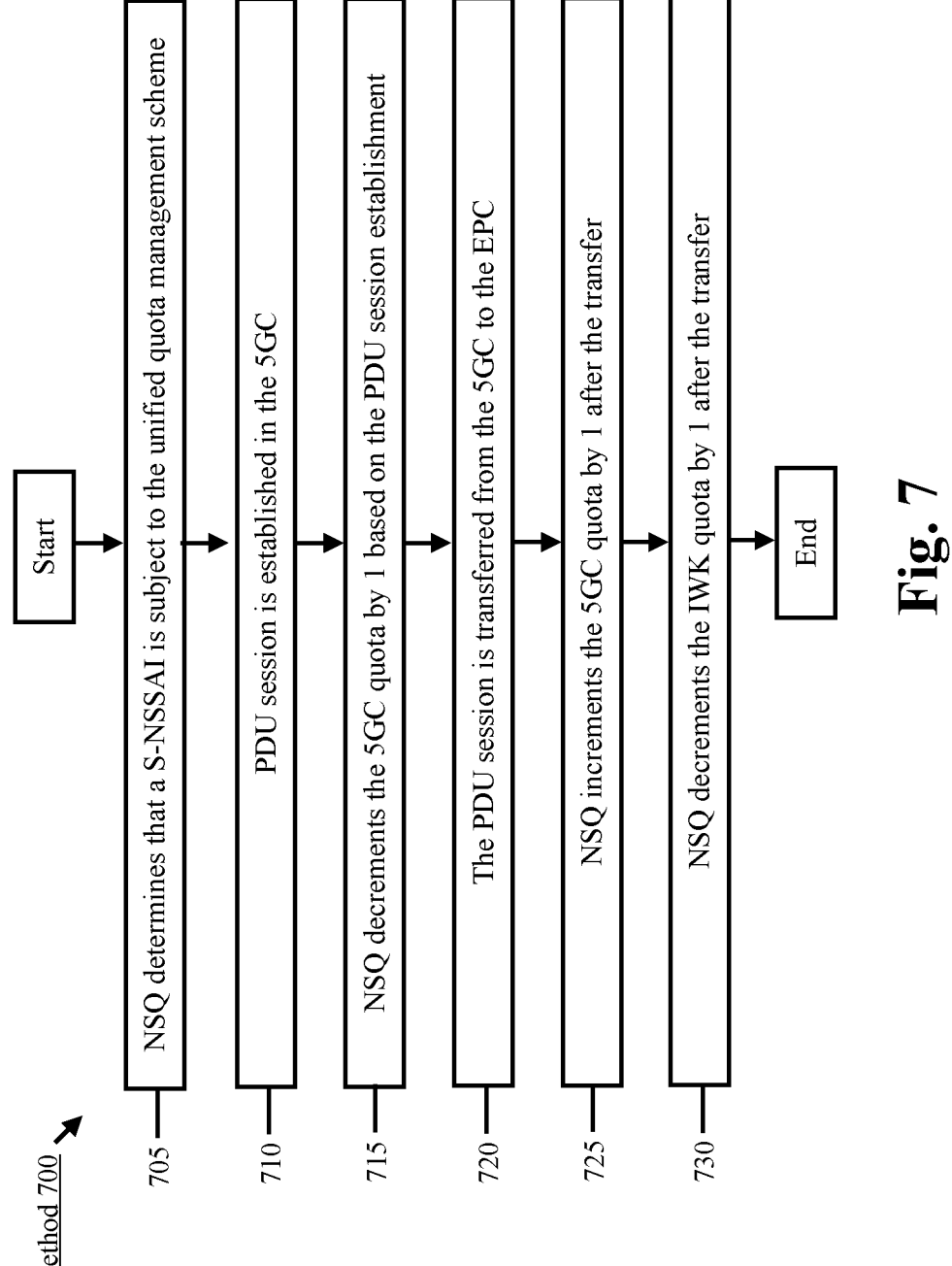
FIG. 7 shows a method for the unified quota management scheme according to various exemplary embodiments.

FIG. 7 shows a method 700 for the unified quota management scheme according to various exemplary embodiments. The method 300 is described from the perspective of the NSQ 245 of the network architecture 200.

In 705, the NSQ 245 determines that a S-NSSAI is subject to the unified quota management scheme. In this scheme, the network slice quota for the S-NSSAI is partitioned into the 5GC quota and the IWK quota.

In 710, a PDU session is established for the UE 110 in the 5GC. In 715, the NSQ 245 may decrement 5GC quota by 1 based on the PDU session establishment.

In 720, the PDU sessions may be transferred from the 5GC to the EPC (e.g., an interworking handover scenario). In 725, the NSQ 245 may increment 5GC quota by 1 after the handover. Since this is the unified quota management scheme, the IWK quota may be used to account for UEs/sessions that are registered to the EPC. Thus, in 730, the NSQ 245 may also decrement the IWK quota by 1.

The 5GC only quota management scheme and the unified management scheme use the IWK quota slightly differently. As demonstrated above, the IWK quota of the 5GC only quota management scheme is used for UEs/session that are registered to the 5GC. Thus, the IWK quota of the 5GC only quota management scheme accounts for UEs/sessions that are registered to the 5GC after an interworking handover scenario. The IWK quota of the unified management scheme accounts UEs/sessions that are not registered to the 5GC but may be transferred to the 5GC during the lifespan of the session. Thus, the IWK quota of the unified quota management scheme may be used to account for UEs/sessions that are registered to the EPC.

In some scenarios, the IWK quota may be unavailable. For example, the count of PDN session corresponding to the S-NSSAI associated with the same data network name (DNN) may be equal to the maximum value. Despite the IWK quota being unavailable, the NSQ 245 may still account for the handover by maintaining the 5GC quota. Thus, there may be scenarios in which the NSQ 245 accounts for sessions registered to the EPC using the 5GC quota.

FIG. 8 shows a method 800 for the unified quota management scheme according to various exemplary embodiments. The method 800 is described from the perspective of the NSQ 245 of the network architecture 200.

In 805, the NSQ 245 determines that a S-NSSAI is subject to the 5GC unified quota management scheme. In this scheme, the network slice quota for the S-NSSAI is partitioned into the 5GC quota and the IWK quota.

In 810, a PDN session is established for the UE 110 in the EPC. In 815, the NSQ 245 determine that the combination of SMF+PGW-C and APN associated with the PDN on the EPC has a corresponding 5G S-NSSAI associated with the same DNN. In this example, it is assumed that there is a corresponding 5G S-NSSAI associated with the same DNN. However, there may be scenarios where there is not a corresponding 5G S-NSSAI associated with the same DNN. In this type of scenario, the NSQ 245 may utilize a standard quota management scheme, the 5GC only quota management scheme or any other appropriate quota management techniques instead of the unified quota management scheme described herein.

In 820, the NSQ 245 may decrement the IWK quota based on the PDN session establishment and/or identifying that the APN associated with the PDN on the EPC has a corresponding 5G S-NSSAI associated with the same DNN. In some embodiments, if the IWK quota is full, the NSQ 245 may still permit the session by accounting for the UE/session using the 5GC quota. In this type of scenario, instead of decrementing the IWK quota by 1, the NSQ 245 may decrement the 5GC quota to account for a UE/session registered on the EPC.

In 825, the PDN sessions may be transferred from the EPC to the 5GC (e.g., an interworking handover scenario). The session may now be considered a 5G PDU session. In 830, the NSQ 245 does not decrement or increment either the 5GC quota or the IWK quota. Thus, in this example, the IWK quota is still being used to account for the UE/session after the transfer.

In 835, the 5G PDU session may be transferred back to the EPC. In 840, the NSQ 245 does not decrement or increment either the 5GC quota or the IWK quota. Thus, in this example, a session that originated in EPC, transferred to 5GC and then transferred back to EPC may be accounted by the NSQ 245 using only the IWK quota part.

FIG. 9 shows a method 900 for the unified quota management scheme according to various exemplary embodiments. The method 900 is described from the perspective of the NSQ 245 of the network architecture 200.

In 905, the NSQ 245 determines that a S-NSSAI is subject to the 5GC only quota management scheme. In this scheme, the network slice quota for the S-NSSAI is partitioned into the 5GC quota and the IWK quota.

In 910, a PDU session is established for the UE 110 in the 5GC. In 915, the NSQ 245 may decrement the 5GC quota by 1 based on the PDU session establishment. In 920, the PDU session may be transferred from the 5GC to the EPC (e.g., an interworking handover scenario).

In 925, the NSQ 245 may increment the 5GC quota by 1 after the handover. In 930, the NSQ may also decrement the IWK quota by 1 after the handover. At this time, the session that originated in the 5GC in 910 is now registered to the EPC as a PDN session. Thus, the UE/session currently registered on the EPC is being accounted for in the unified quota management scheme using the IWK quota.

In 935, the PDN sessions may be transferred from the EPC to back to the 5GC. In 940, the NSQ 245 may decrement the 5GC quota by 1 after the handover. In 945, the NSQ 245 may also increment the IWK quota by 1 after the handover.

FIG. 10 shows a method 1000 for the unified quota management scheme according to various exemplary embodiments. The method 1000 is described from the perspective of the NSQ 245 of the network architecture 200.

In 1005, the NSQ 245 determines that a S-NSSAI is subject to the 5GC unified quota management scheme. In this scheme, the network slice quota for the S-NSSAI is partitioned into the 5GC quota and the IWK quota.

In 1010, a PDN session is established for the UE 110 in the EPC. In 1015, the NSQ 245 determines that the APN associated with the PDN on the EPC has a corresponding 5G S-NSSAI associated with the same DNN. In this example, it is assumed that there is a corresponding 5G S-NSSAI associated with the same. However, there may be scenarios in which there is not a corresponding 5G S-NSSAI associated with the same DNN. In this type of scenario, the NSQ 245 may utilize a standard quota management scheme, the 5GC only quota management scheme or any other appropriate quota management techniques instead of the unified quota management scheme described herein.

In 1020, the NSQ 245 may decrement the IWK quota based on the PDN session establishment and/or identifying that the APN associated with the PDN on the EPC has a corresponding 5G S-NSSAI associated with the same DNN. In some embodiments, if the IWK quota is full, the NSQ 245 may still permit the handover by accounting for the UE/session using the 5GC quota. In this type of scenario, instead of decrementing the IWK quota by 1, the NSQ 245 may decrement the 5GC quota to account for a UE/session registered on the EPC.

In 1025, the PDN sessions may be transferred from the EPC to the 5GC (e.g., an interworking handover scenario). The session may now be considered a 5G PDU session. In 1030, the NSQ 245 does not decrement or increment either the 5GC quota or the IWK quota. Thus, in this example, the IWK quota is still being used to account for the UE/session after the transfer.

FIG. 11 shows a NSQ decision making table 1100. The table 1100 summarizes the scenarios and operations that may be performed by the NSQ 245 in accordance with the 5G only quota management scheme and the unified quota management scheme. Entry 1105 of the table 1100 summarizes the method 300, entry 1110 of the table 1100 summarizes the method 400, entry 1115 of the table 1100 summarizes the method 500, entry 1120 of the table 1100 summarizes the method 600, entry 1125 of the table 1100 summarizes the method 700, entry 1130 of the table 1100 summarizes the method 800, entry 1135 of the table 1100 summarizes the method 900 and entry 1140 of the table 1100 summarizes the method 1000.

Figure 12:
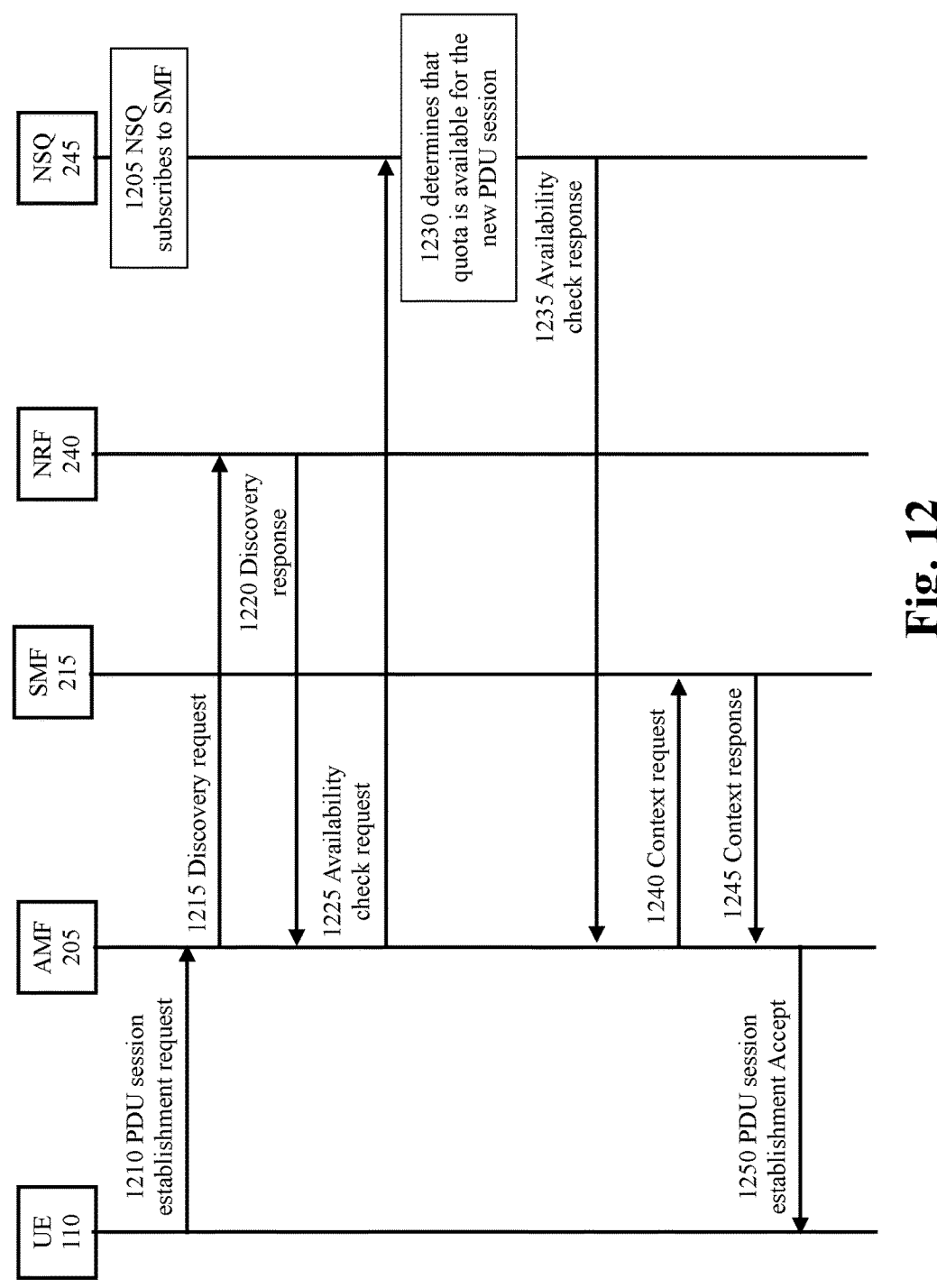
FIG. 12 shows an exemplary call flow for network slice quota management according to various exemplary embodiments.

FIG. 12 shows an exemplary call flow 1200 for network slice quota management according to various exemplary embodiments. The exemplary call flow 1200 includes the UE 110, the AMF 205, the SMF 215, the NRF 240 and the NSQ 245.

In 1205, the NSQ 245 subscribes to the SMF 215. This may include the NSQ 245 receiving an indication that the NSQ 245 is to keep track of the number of PDU sessions active for a particular S-NSSAI, DNN or both.

In 1210, the UE 110 may transmit a PDU session establishment request to the AMF 205. The PDU session establishment request may include a requested S-NSSAI and/or DNN.

In 1215, the AMF 205 may transmit a discovery request to the NRF 240. For example, the discovery request may be transmitted by the AMF 205 over the Nnrf interface shown in FIG. 2 to the NRF 240. This request may be referred to as a "Nnrf_NFDiscovery_Request" and may include a S-NSSAI and an indication that the discovery request is for a NSQ type network function.

In 1220, the NRF 240 may transmit a discovery response to the AMF 205. For example, the discovery response may be transmitted by the NRF 240 over the Nnrf interface shown in FIG. 2 to the AMF 205. This response may be referred to as a "Nnrf_NFDiscovery_Response" and may include an address for the NSQ 245. This signaling exchange enables the AMF 205 to find the NSQ 245.

In 1225, the AMF 205 may transmit an availability check request to the NSQ 245. For example, this request may be transmitted by the AMF 205 over the Nnsq interface shown in FIG. 2 to the NSQ 245. This request may be referred to as a "Nnsq_PDUCSessionCount_AvailabilityCheck_Request" and may include a S-NSSAI and a DNN.

In 1230, the NSQ 245 determines whether quota is available for a new PDU session to be established in the S-NSSAI. Here, the NSQ 245 may perform the types of operations described above with regard to the methods 200-1000 of FIGS. 2-10. For example, the NSQ 245 may check the 5GC quota part of the network slice quota and determine whether establishing the new PDU session would cause the 5GC quota and/or network slice quota to be exceeded. If there is still availability, the PDU session may be established and the NSQ 245 may decrement the 5GC quota (e.g., add the new PDU session to the count).

In 1235, the NSQ 245 may transmit an availability check response to the AMF 205. For example, this response may be transmitted by the NSQ 245 over the Nnsq interface shown in FIG. 2 to the AMF 205. This response may be referred to as a "Nnsq_PDUSessionCount_Availability_ CheckResponse" and may include a S-NSSAI, a DNN and a success code.

In 1240, the AMF 205 may transmit a context request to the SMF 215. This request may be referred to as a "Nsmf_P-DUsessionCount_CreateSMContextRequest" and may include a S-NSSAI and a PDU session ID. In 1245, the SMF 215 may transmit a context response to the AMF 205. This response may be referred to as a "Nsmf_PDUsessionCount_ CreateSMContextResponse" and may include an indication that the request has been granted. In 1250, the AMF 205 may transmit a PDU session establishment accept message to the UE 110. In some embodiments, an SMF may be configured to perform the same procedures as the AMF 205, e.g., an SMF may perform 1215, 1225, etc.

Figure 13:
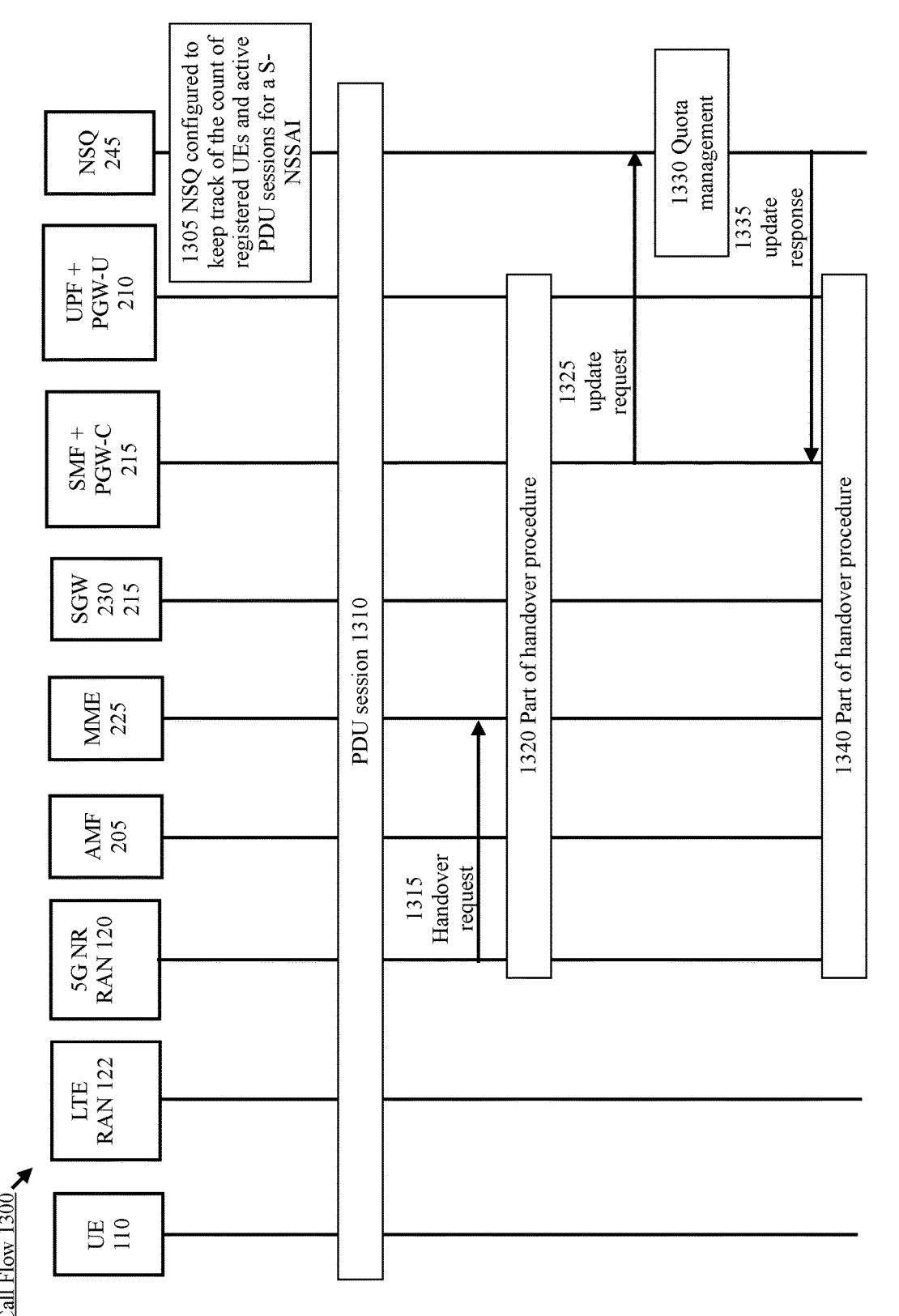
FIG. 13 shows an exemplary call flow for network slice quota management according to various exemplary embodiments.

FIG. 13 shows an exemplary call flow 1300 for network slice quota management according to various exemplary embodiments. The exemplary call flow 1300 relates to a scenario in which there is an interworking handover from 5GC to EPC. The call flow 1300 includes the UE 110, the LTE RAN 122, the 5G NR RAN 120, the AMF 205, the MME 225, the SGW 230, the SMF+PGW-C 215, the UPF+PGW-U 210 and the NSQ 245.

In 1305, the NSQ 245 is configured to keep track of the count of registered UEs for a S-NSSAI and a count of active PDU sessions for the S-NSSAI.

In 1310, a PDU session is established in 5GC and is currently active. This PDU session corresponds to the S-NS-SAI which is subject to quota management. In this example, this PDU session is already active and thus, the NSQ 245 has already accounted this in the quota (e.g., decrement the 5GC quota).

During operation, the 5G NR RAN 120 may determine that handover to EPC is triggered based on measurement reports received from the UE 110 (not pictured). Thus, in 1315, the 5G NR RAN 120 initiates a handover procedure by transmitting a handover request to the AMF 205.

In 1320, a portion of a handover procedure may be performed. For example, the call flow from the third generation partnership (3GPP) technical specification (TS) 23.502 section 4.11.1.2.1-1 may be implemented during the handover. The portion of the handover in 1220 may include steps 2a, 2b and 2c of TS 23.502 section 4.11.1.2.1-1.

In 1325, the SMF+PGW-C 215 may request that the NSQ update the quota. This request may be referred to as a "Nnsq_PDUSessionCount_Update_Request" and may include parameters such as, but not limited to, PDU session ID, S-NSSAI, DNN, a requester identifier indicating whether the request is coming from the SMF or PGW-C entity, etc.

In 1330, the NSQ 245 may perform quota management using the exemplary quota management techniques described herein. Here, the NSQ 245 may operate in accordance with the NSQ decision making table 1100. To provide an example, these operations may include, but are not limited to NSQ increments/decrement to the corresponding quota for the count of registered UEs for the S-NSSAI and the count of active PDU sessions for the S-NSSAI.

In 1335, the NSQ 245 may transmit a response to the SMF+PGW-C 215. This response may be referred to as a "Nnsq_PDUSessionCount_Update_Response" and indicate that there is availability in the quota and the PDU session may be transferred to the EPC. In some embodiments, if the quota is full, the NSQ 245 may reject the request.

In 1340, another portion of the handover procedure may be performed. The portion of the handover in 1215 may include steps 3-21 of TS 23.502 section 4.11.1.2.1-1.

Figure 14:
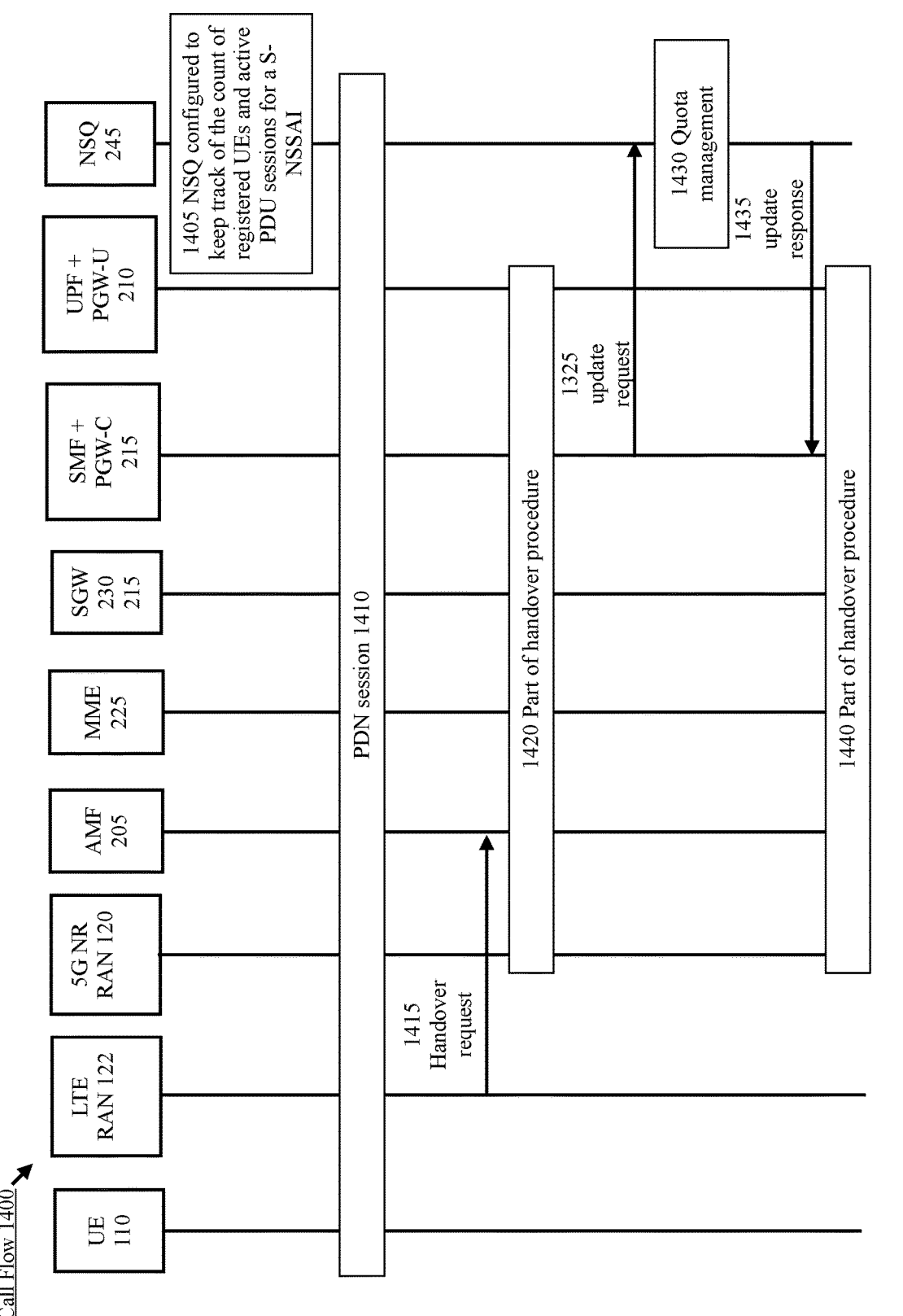
FIG. 14 shows an exemplary call flow for network slice quota management according to various exemplary embodiments.

FIG. 14 shows an exemplary call flow 1400 for network slice quota management according to various exemplary embodiments. The exemplary call flow 1300 relates to a scenario in which there is an interworking handover from EPC to 5GC. The call flow 1300 includes the UE 110, the LTE RAN 122, the 5G NR RAN 120, the AMF 205, the MME 225, the SGW 230, the SMF+PGW-C 215, the UPF+PGW-U 210 and the NSQ 245.

In 1405, the NSQ 245 is configured to keep track of the count of registered UEs for a S-NSSAI and a count of active PDU sessions for the S-NSSAI.

In 1410, a PDN session is established in the EPC and is currently active. In addition, the DNN of this PDN session corresponds to a S-NSSAI which is subject to quota management. In this example, the NSQ 245 has already accounted for this PDN using the IWK quota (or the 5GC quota) if the unified data management scheme is being implemented.

During operation, the LTE RAN 122 may determine that handover to 5GC is triggered based on measurement reports received from the UE 110 (not pictured). Thus, in 1415, the LTE RAN 122 initiates a handover procedure by transmitting a handover request to the MME 225.

In 1420, a portion of a handover procedure may be performed. For example, the call flow from 3GPP TS 23.502 section 4.11.1.2.2.2-1 may be implemented during the handover. The portion of the handover in 1320 may include steps 1-4 of TS 23.502 section 4.11.1.2.2.2-1.

In 1425, the SMF+PGW-C 215 may request that the NSQ update the quota. This request may be referred to as a "Nnsq_PDUSessionCount_Update_Request" and may include parameters such as, but not limited to, PDU session ID, S-NSSAI, DNN, a requested identifier indicating whether the request is coming from the SMF or PGW-C entity, etc.

In 1430, the NSQ 245 may perform quota management using the exemplary quota management techniques described herein. Here, the NSQ 245 may operate in accordance with the NSQ decision making table 1100. To provide an example, when the 5GC only quota management scheme is in place, the NSQ 245 may perform operations such as, checking the quota availability for registered UE count and PDU session count from the IWK quota. If the IWK quota is available, the NSQ 245 may decrement the quota and send a success message. If the IWK quota is unavailable, the NSQ 245 may check availability of the 5GC quota. If the 5GC quota is available, the NSQ 245 may decrement the quota and send a success message. If the 5GC quota is unavailable, the NSQ 245 may send a message with a cause code for quota unavailable. This will cause the PDU session request to be rejected during the handover from EPC to 5GC.

To provide another example, when the unified quota management scheme is in place, the NSQ 245 may decrement the quota for the UE ID and the S-NSSAI from the IWK quota. If the IWK quota is not available, the NSQ 245 may decrement the quota from the 5GC quota. If the 5GC quota is also unavailable, the PDN session may be rejected.

In 1435, the NSQ 245 may transmit a response to the SMF+PGW-C 215. This may be referred to as a "Nnsq_P-DUSessionCount_Update_Response" and indicate that there is availability in the quota and the PDU session may be transferred to the EPC. In some embodiments, if the quota is full, the NSQ 245 may reject the request.

In 1440, another portion of the handover procedure may be performed. The portion of the handover in 1215 may include steps 5-15 of TS 23.502 section 4.11.1.2.2.2-1.

FIG. 15 shows an exemplary UE 110 according to various exemplary embodiments. The UE 110 will be described with regard to the network arrangement 100 of FIG. 1. The UE 110 may include a processor 1505, a memory arrangement 1510, a display device 1515, an input/output (I/O) device 1520, a transceiver 1525 and other components 1530. The other components 1530 may include, for example, an audio input device, an audio output device, a power supply, a data acquisition device, ports to electrically connect the UE 110 to other electronic devices, etc.

The processor 1505 may be configured to execute a plurality of engines of the UE 110. For example, the engines may include a session management engine 1535. The session management engine 1535 may perform operations related to establishing a PDN session, establishing a PDU session and maintaining a session during an interworking handover scenario.

The above referenced engine being an application (e.g., a program) executed by the processor 1505 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 1505 is split among two or more processors such as a baseband processor and an applications processor. The exemplary embodiments may be implemented in any of these or other configurations of a UE.

The memory arrangement 1510 may be a hardware component configured to store data related to operations performed by the UE 110. The display device 1515 may be a hardware component configured to show data to a user while the I/O device 1520 may be a hardware component that enables the user to enter inputs. The display device 1515 and the I/O device 1520 may be separate components or integrated together such as a touchscreen. The transceiver 1525 may be a hardware component configured to establish a connection with the 5G NR-RAN 120, an LTE-RAN (not pictured), a legacy RAN (not pictured), a WLAN (not pictured), etc. Accordingly, the transceiver 1525 may operate on a variety of different frequencies or channels (e.g., set of consecutive frequencies).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a network function configured to perform operations comprising:

identifying a network slice quota for a single network slice selection assistance information (S-NSSAI);

determining that the network slice quota for the S-NSSAI includes a first quota corresponding to fifth generation (5G) packet data unit (PDU) sessions and a second quota corresponding to interworking handovers between a fifth generation core (5GC and an evolved packet core (EPC);

receiving a request to update the network slice quota; and updating the network slice quota for the S-NSSAI based on the request.

2. The processor of claim 1, wherein the request to update the network slice quota is associated with a PDU session that originated in the 5GC and is being transferred to the EPC, and wherein updating the network slice quota includes incrementing the first quota.

3. The processor of claim 1, wherein the request to update the network slice quota is associated with a session that originated in the EPC, is currently registered to the 5GC and is being transferred to the EPC, and wherein updating the network slice quota includes incrementing the second quota.

4. The processor of claim 1, wherein the request to update the network slice quota is associated with a session that originated in the 5GC, is currently registered to the EPC and is being transferred to the 5GC, and wherein updating the network slice quota includes decrementing the first quota.

5. The processor of claim 1, wherein the request to update the network slice quota is associated with a session that originated in the 5GC, is currently registered to the EPC and is being transferred to the 5GC, and wherein updating the network slice quota includes:

determining that the first quota is unavailable; and decrementing the second quota based on the first quota being unavailable.

6. The processor of claim 1, wherein the request to update the network slice quota is associated with a session that originated in the EPC and is being transferred to the 5GC, and wherein updating the network slice quota includes decrementing the second quota.

7. The processor of claim 1, wherein the request to update the network slice quota is associated with a session that originated in the EPC and is being transferred to the 5GC, and wherein updating the network slice quota includes:
determining that the second quota is unavailable; and
decrementing the first quota based on the second quota being unavailable.

8. The processor of claim 1, wherein the request to update the network slice quota is associated with a PDU session that originated in the 5GC and is being transferred to the EPC, and wherein updating the network slice quota includes:
incrementing the first quota; and
decrementing the second quota.

9. The processor of claim 1, wherein the request to update the network slice quota is associated with a PDU session that originated in the 5GC and is being transferred to the EPC, and wherein updating the network slice quota includes:
determining that the second quota is unavailable; and
maintaining the first quota.

10. The processor of claim 1, wherein the request to update the network slice quota is associated with a packet data network (PDN) session that originated in the EPC, wherein the combination of a session management function (SMF)+packet gateway (PGW)-control plane (C) and APN are associated with a same data name network (DNN) and S-NSSAI, and wherein updating the network slice quota include decrementing the second quota.

11. The processor of claim 1, wherein the request to update the network slice quota is associated with a session that originated in the 5GC, is currently registered in EPC and is being transferred to the 5GC, and wherein updating the network slice quota includes:
incrementing the second quota; and
decrementing the first quota.

12. The processor of claim 1, wherein the request to update the network slice quota is associated with a session that originated in the 5GC, is currently registered to the EPC and is being transferred to the 5GC, and wherein updating the network slice quota includes:
determining that the first quota is unavailable; and
maintaining the second quota.

13. The processor of claim 1, wherein the request is sent to the network function by a single session management function (SMF) and packet gateway (PGW)-control plane entity configured for an interworking architecture.

14. The processor of claim 1, wherein the request includes a requester identifier indicating whether the request is sent to the network function by a session management function (SMF) or a packet gateway (PGW)-control plane (C) entity.

15. The processor of claim 1, the operations further comprising:
receiving an indication that a session originated in one of a fifth generation core (5GC) or an evolved packet core (EPC), wherein the request is related to the session.

16. The processor of claim 1, the operations further comprising:
determining whether a fifth generation core (5GC) only quota management scheme or a unified data management scheme is to be utilized based on the S-NSSAI and a user equipment (UE) ID.

17. A computer readable storage medium storing instructions that are executable by a processor, wherein the instructions cause the processor to perform operations comprising:
identifying a network slice quota for a single network slice selection assistance information (S-NSSAI);
determining that the network slice quota for the S-NSSAI includes a first quota corresponding to fifth generation (5G) packet data unit (PDU) sessions and a second quota corresponding to interworking handovers between a fifth generation core (5GC and an evolved packet core (EPC);
receiving a request to update the network slice quota; and
updating the network slice quota for the S-NSSAI based on the request.

18. The computer readable storage medium of claim 17, wherein the request is sent by a single session management function (SMF) and packet gateway (PGW)-control plane entity configured for an interworking architecture.

19. The computer readable storage medium of claim 17, wherein the request includes a requester identifier indicating whether the request is sent by a session management function (SMF) or a packet gateway (PGW)-control plane (C) entity.

20. The computer readable storage medium of claim 17, the operations further comprising:
receiving an indication that a session originated in one of a fifth generation core (5GC) or an evolved packet core (EPC), wherein the request is related to the session.

21. The computer readable storage medium of claim 17, the operations further comprising:
determining whether a fifth generation core (5GC) only quota management scheme or a unified data management scheme is to be utilized based on the S-NSSAI and a user equipment (UE) ID.

* * * * *